United States Patent [19]
Knox et al.

[11] 3,792,752
[45] Feb. 19, 1974

[54] PORTABLE SEISMIC TOOL

[75] Inventors: William A. Knox; Hillman Southwick; Marion L. Parker, all of Houston, Tex.

[73] Assignee: Western Geophysical Company of America, Houston, Tex.

[22] Filed: Dec. 4, 1972

[21] Appl. No.: 312,002

[52] U.S. Cl. ............................................. 181/.5 XC
[51] Int. Cl. ..................................................... G01v
[58] Field of Search ....... 181/.5 XC, .5 EC; 166/299

[56] References Cited
UNITED STATES PATENTS

| | | | |
|---|---|---|---|
| 3,115,226 | 12/1963 | Thompson | 166/299 |
| 2,614,804 | 10/1952 | Carlisle | 181/.5 XC |
| 2,353,484 | 7/1944 | Merten | 181/.5 XC |
| 2,846,019 | 7/1958 | Long | 181/.5 XC |

*Primary Examiner*—Benjamin A. Borchelt
*Assistant Examiner*—J. V. Doramus
*Attorney, Agent, or Firm*—Michael P. Breston

[57] ABSTRACT

A portable tool for use in seismic operations comprises a two-part auger including a tubular housing section and a bit section. Plunger means are slidably disposed in the housing section for downwardly driving engagement with a stem secured to the bit section thereby to forcibly projecting the bit section into the earth relative to the housing and forming a cavity communicating with an outlet port in the stem.

3 Claims, 10 Drawing Figures

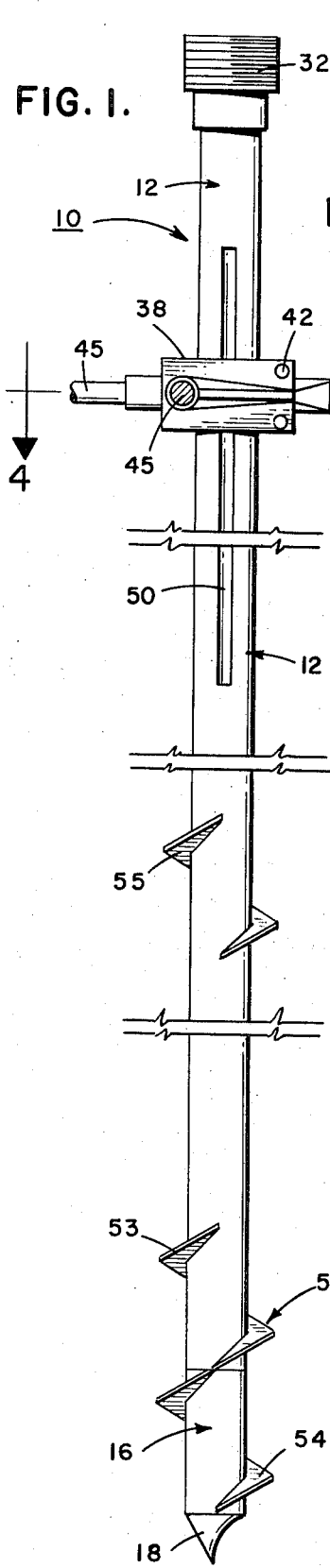
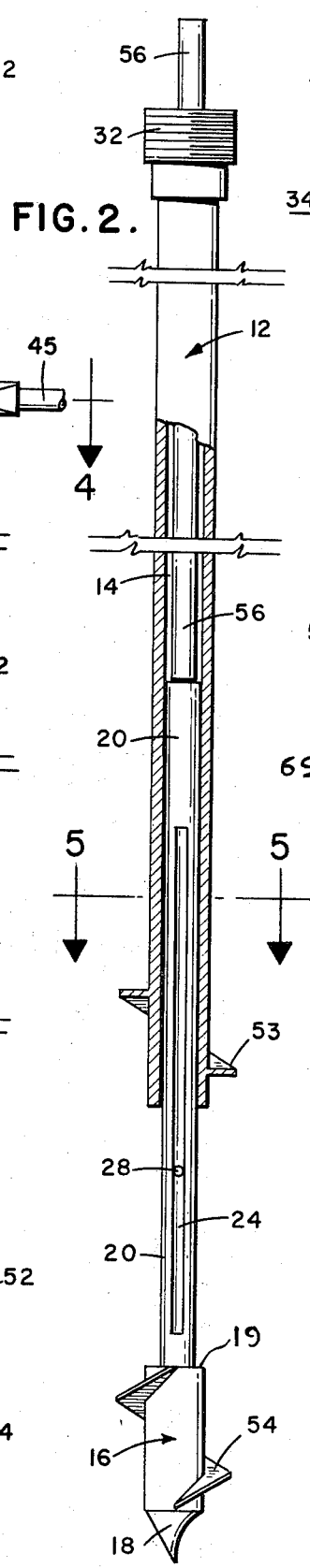
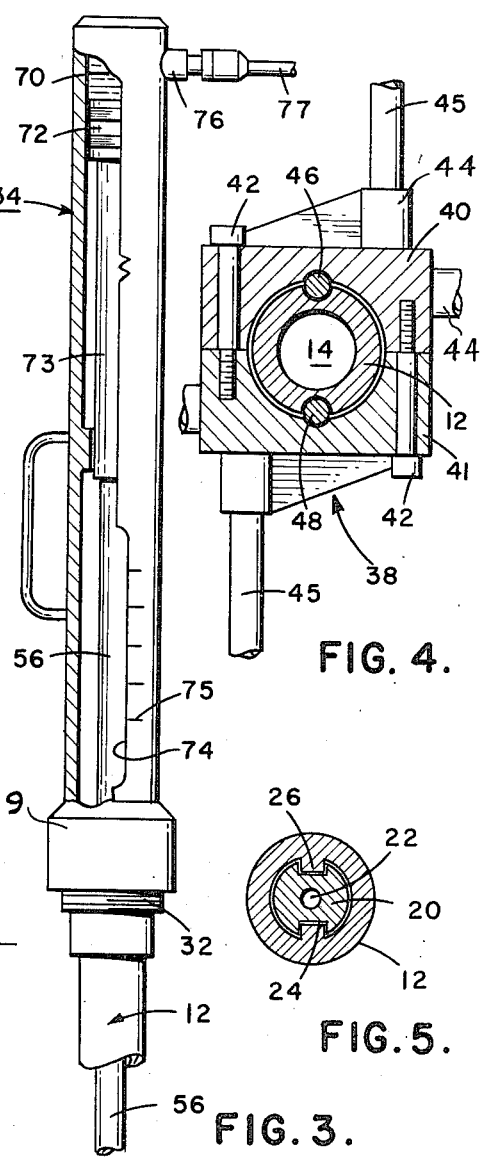
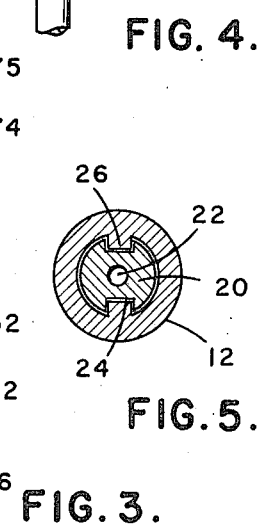
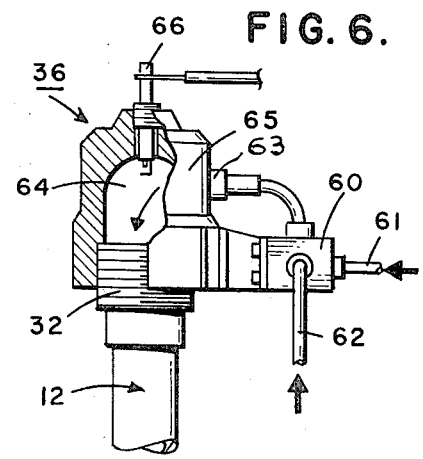

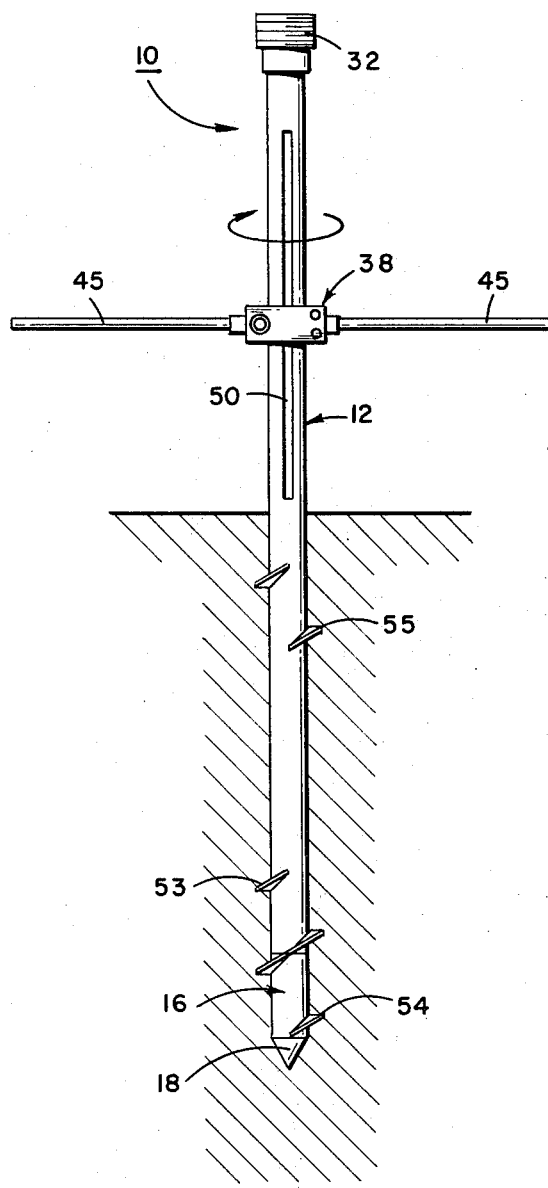
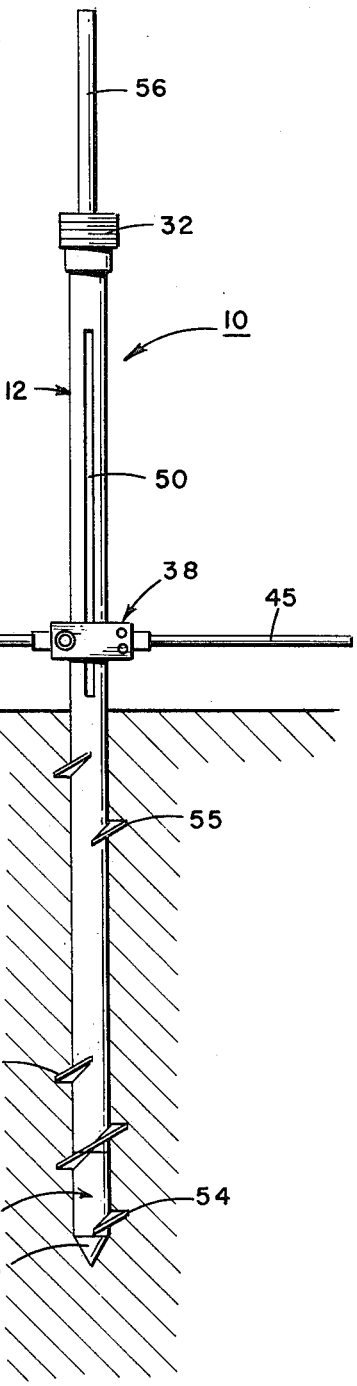

3,792,752
FIG. 9.
FIG. 10.
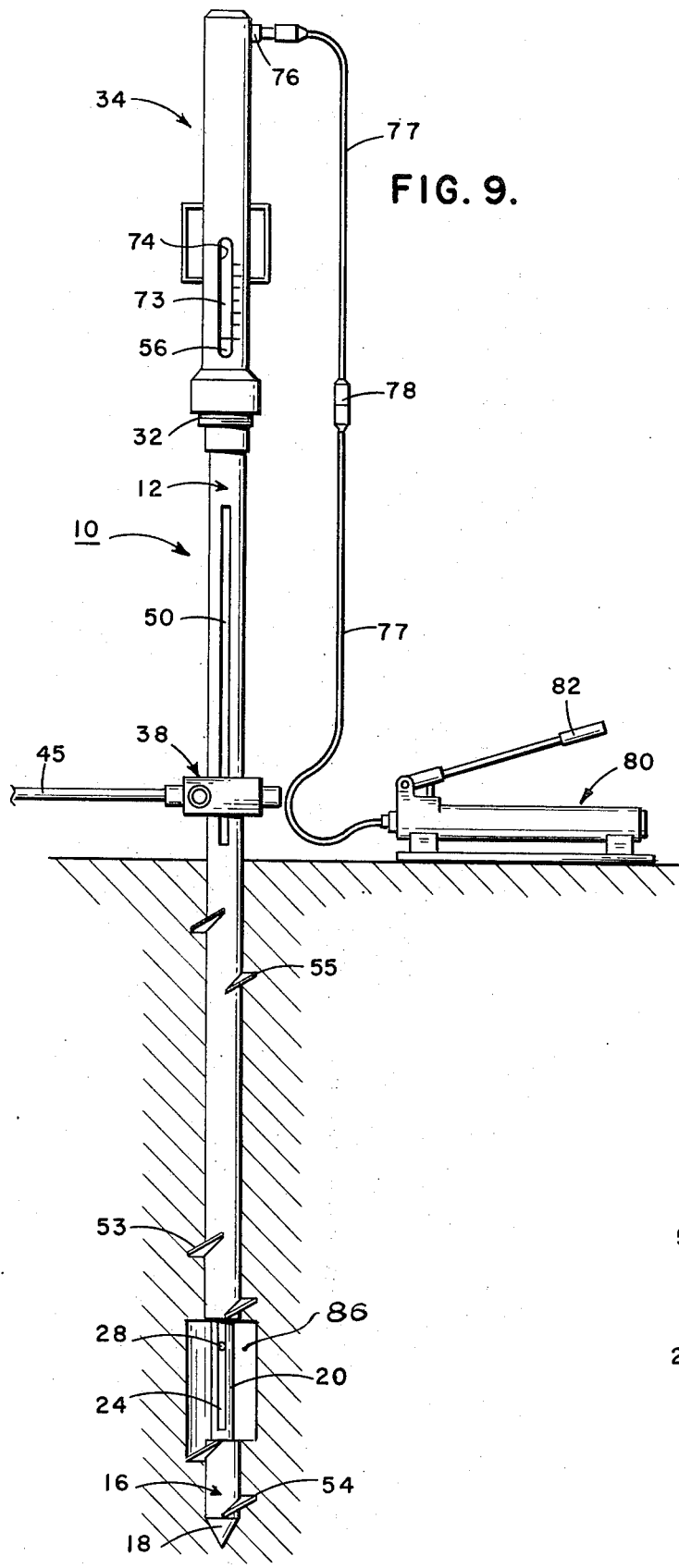
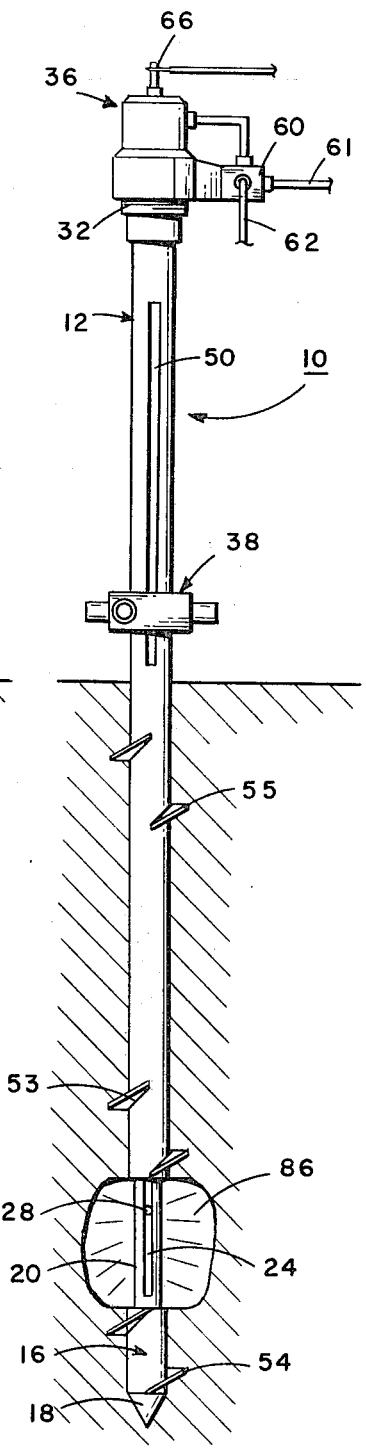

PORTABLE SEISMIC TOOL

BACKGROUND OF THE INVENTION

During the early stages of seismic geophysical surveying, seismic waves were generated by detonating solid chemical explosives, such as dynamite, in a shot hole drilled to a depth well below the unconsolidated earth layers. Drilling of the shot holes is expensive, and handling of such explosives is hazardous.

U.S. Pat. No. 2,353,484 of E. Merten, et al. proposes to create a seismic explosion by introducing at separate but nearby points on the ground a fuel gas and an oxidizer gas (air or oxygen) for the purpose of allowing the two gases to mix together under the earth's surface. The detonation of the resulting combustible gas mixture is accomplished by introducing a spark at a third point distinct from the points at which the gases were introduced. Such underground mixing of the gases is not dependable. Merten depends upon already-existing pockets in the earth's formation to contain the introduced gases prior to detonation. But, for example, moist clay is virtually impermeable to underground gas mixing.

In copending patent application Ser. No. 61,293, assigned to Amoco Production Company, there is disclosed a method for generating undersurface seismic impulses by mechanically forming a cavity below the earth's surface, filling the cavity with a charge of explosive gas, and exploding the charge in the cavity to thereby generate an undersurface seismic impulse. The cavity is formed by screwing an auger into the ground to a predetermined depth below the earth's surface, and then lifting, without rotating, the auger. This method requires that the auger be rotated by powered rotating means and then lifted by powered lifting means all mounted on a self-propelled vehicle. When such powered means are available, this method works very well. However, in many parts of the world, including jungles, swamps and muskegs such motorized machines are either not available or cannot be employed.

In copending application Ser. No. 97,932 assigned to the same assignee, there is disclosed a method for screwing an auger below the earth's surface, the auger defining a combustion chamber having a gas inlet and a gas outlet with a plug in the outlet, introducing an initial charge of explosive gas through the inlet and into the combustion chamber with the outlet being closed by the plug, detonating the initial charge in the combustion chamber to explosively move the plug outwardly of the outlet and detonating a subsequent charge in the cavity formed by the outward movement of the plug in the portion of the earth surrounding the outlet. While this method can be carried out with portable hand tools, in some soils the amount of energy which can be obtained from the initial explosion in a hand-operated auger is insufficient to forcibly project the plug into the earth. Under certain conditions, it may be necessary to conserve fuel energy and not to use it for ejecting the plug which creates the gas-receiving cavity.

SUMMARY OF THE INVENTION

This invention provides a portable tool for use in seismic operations. The tool comprises a two-part auger having a tubular housing section and a bit section carrying earth-engaging blades. A tubular stem secured to the bit section is received in non-rotatable sliding engagement in the bore of the housing section. An outlet port in the stem provides communication between the bore of the stem and the exterior of the tool when the bit section is extended relative to the housing section. In a preferred embodiment, a plunger means is slidably disposed in the housing section for downward driving engagement with the upper end of the stem whereby to forcibly project the bit section into the earth relative to the housing section, and to thereby cause the bit section to form an enlarged earth cavity communicating with the port.

BRIEF DESCRIPTION OF THE DRAWINGS

FIG. 1 is a perspective view of the portable tool of this invention with the bit in its retracted position;

FIG. 2 is a partly-sectional view of the tool with the bit in its extended position;

FIG. 3 is a partly-sectional view of a hydraulic cylinder for moving a plunger inside the tool;

FIG. 4 is a sectional view on line 4—4 of the kelly shown in FIG. 1;

FIG. 5 is a sectional view on line 5—5 in FIG. 2;

FIG. 6 is a partly-sectional view of a combustible fluid supply and ignition means;

FIG. 7 shows the tool of FIG. 1 as it is being screwed into the ground;

FIG. 8 shows the tool after it has been screwed into the ground to a desired point below the earth's surface and with the plunger ready to become actuated by the hydraulic cylinder shown in FIG. 3;

FIG. 9 is a view in perspective illustrating the use of the tool for creating an undersurface cavity serving as a combustion chamber; and FIG. 10 is a view in perspective illustrating the use of the tool for generating a seismic impulse in the combustion chamber.

Referring to the drawings and particularly to FIGS. 1–6 thereof, wherein the same reference characters are used to designate the same parts, there is shown a portable tool for generating seismic impulses below the earth's surface during seismic operations. The tool comprises a two-part auger 10 having a hollow, elongated tubular housing section 12 and a bit section 16. Housing 12 has a bore 14 extending throughout its length. Bit 16 has at its bottom end a point 18 and extending from its top end 19 is a hollow tubular stem 20 having a longitudinal bore 22. Stem 20 is slidably and non-rotatably mounted in bore 14.

To allow housing 12 to support bit 16 when the bit is in its fully-extended position relative to the housing, and to allow stem 20 to transmit torque between housing 12 and bit 16, there are provided in the outer wall of stem 20 two diametrically-opposed, longitudinally-extending keyways 24 and in the inner wall of housing 12 are provided two diametrically-opposed, longitudinally-extending mating keys 26 (FIG. 5). Keys 26 allow the housing and the bit to move relative to each other from the bit's fully-retracted position (FIG. 1) to its fully-extended position (FIG. 2).

A fluid outlet port 28, formed by a hole extending between the keyways 24, provides a fluid flow path between the outside space surrounding stem 20, bore 22, bore 14, and the outside of the tool above the earth's surface.

The top end of housing 12 is provided with a threaded male head 32 adapted to become threadedly coupled to a hydraulically-operated power cylinder 34 or to a combustible-fluid-supply-and-ignition head 36. Auger 10 is provided with an auger blade 54 on bit 16 and at least another auger blade 53 on the bottom end of housing 12. To facilitate the screwing in of auger 10, blades 53 and 54 are preferably in alignment to form a continuous length of helical blade as shown in FIG. 1. To facilitate the unscrewing of auger 10 from the earth, there is desirably provided another length of auger blade 55 above auger blade 53.

To screw auger 10 into the ground, there is provided a suitable kelly 38 made of two parts 40, 41 bolted together by bolts 42. To allow torque to be transmitted from kelly 38 to housing 12, there are provided two diametrically-opposed, longitudinally-extending keyways 50 in the outer wall of housing 12 and two mating roller keys 46, 48 in kelly 38 (FIG. 4). Kelly 38 can be conveniently rotated by inserting rods 45 into each of four sockets 44.

The main functions of the seismic tool of this invention are to first create a cavity in the earth between bit 16 and housing 12 by separating them after auger 10 is completely screwed into the ground, and subsequently to create a seismic explosion in the thusly formed cavity.

These functions are broadly accomplished by first projecting bit 16 from housing 12 with the hydraulically-operated cylinder 34, and then exploding in the cavity a combustible fluid.

The hydraulic cylinder 34 includes a fluid chamber 70 having an inlet port 76 which is coupled to a hydraulic pump 80 (FIG. 9) operated by a pivotably-mounted handle 82. Pump 80 is in communication with inlet port 76 through a fluid line 77 and a connector 78. The fluid pressure in chamber 70 becomes exerted against the upper face of a piston head 72. From the lower face of piston head 72 extends a piston 73. Since piston 73 is not sufficiently long, there is desirably provided a plunger 56 between piston 73 and stem 20. The interface between piston 73 and plunger 56 can be observed through a window 74 having axially-spaced graduations 75. The head 69 of power cylinder 70 is threadedly coupled to head 32 of housing 12, after plunger 56 is inserted into bore 14, as shown in FIG. 2.

The fuel-supply, firing-and-mixing head 36 includes a mixing chamber 60 having an oxidizer gas (typically oxygen) inlet 61 and a fuel (typically propane) gas inlet 62. The oxygen and propane gases become thoroughly mixed inside chamber 60. The combustible gas mixture is then admitted through inlet 63 into a firing chamber 64 in a firing head 65. A suitable gas igniter is provided, typically a spark plug 66. The manners of mixing the oxidizer and fuel gases and of firing the combustible gas mixture are well known to those skilled in the art. Consequently, the auxiliary components normally associated with head 36 are not shown.

With particular reference now to FIGS. 7-10, in operation of the portable seismic impulse generator, auger 10 is screwed by kelly 38 into the ground to a sufficient depth below the earth's surface 50 as to reach the consolidated layers of the ground (FIG. 7). After inserting plunger 56 into bore 14 (FIG. 8), head 69 of power cylinder 34 is threadedly secured to head 32 of housing 12, and the hydraulic pump or jack 80 is hand-operated by handle 82 to cause piston 73 to exert a downwardly-directed force against plunger 56, and hence against stem 20 (FIG. 9). The interface between plunger 56 and piston 73 is observed through window 74 of power cylinder 70 and when it reaches the desired graduation 75, the operation of jack 80 is stopped.

The downwardly-exerted force on stem 20 will project bit 16 away from housing 12, and the relative movement therebetween will create a cavity 86 in the earth's formation between housing 12 and bit 16. The diameter of this cavity is primarily determined by the width of auger blade 54, as can best be seen in FIG. 9.

After the formation of cavity 86, cylinder 34 is unscrewed from housing 12, plunger 56 is removed from bore 14, and the gas-supply-and-firing head 34 is now threadedly secured to head 32 of housing 12. A predetermined volume of the combustible gas mixture is admitted through inlet 63, bore 14, bore 22, outlet port 28 and into cavity 86. Igniter 66 is then energized to ignite the gas mixture in the firing chamber 64. Upon becoming ignited, there is formed a detonation shock wave which moves downwardly and substantially-instantaneously from spark plug 66 through bore 14, bore 22, outlet port 28 and into cavity 86. The explosion in the cavity creates high-temperature, high-pressure gaseous products of combustion. The resulting explosion energy provides the desired seismic impulse into the soil abutting the cavity.

Typically, a second charge of combustible gas mixture is then allowed to enter into cavity 86 to become ignited in a manner above described whereby to create a second seismic impulse. The number of seismic impulses which thusly can be created depends on the type of soil. Since the cavity becomes enlarged after each explosion therein, depending on the hardness of the soil, there will be a limit on the number of explosions that can be created in the cavity.

The reflections from the seismic impulses are detected by geophone spreads (not shown) on the earth's surface in a manner well known in the art. The method of geophysical exploration using a plurality of portable seismic impulse generators is disclosed in said copending patent application Ser. No. 97,932.

While this invention has been described with reference to specific embodiments, it is subject to modifications, as will be apparent to those skilled in the art, all falling with the claims attached hereto:

What is claimed is:

1. A portable tool for use in seismic operations, including:
   a. a two-part auger comprising a tubular housing section and a bit section carrying earth-engaging blades;
   b. a tubular stem secured to the bit section and received in non-rotatable sliding engagement in the bore of the housing section;
   c. port means positioned in said stem to provide communication between the bore of said stem and the exterior of said tool when said bit section is extended relative to said housing section;
   d. means including plunger means slidably disposed in said housing section for downward driving engagement with the upper end of said stem whereby to outwardly project said bit section into the earth while maintaining said bit section attached to said housing section, thereby causing said bit section to form an enlarged earth cavity communicating with said port; and e. hand-operated hydraulic jack means detachably interconnected between said plunger means and said tubular housing for driving said plunger means.

2. The tool of claim 1 and further including:

combustible-fuel injection and fuel detonation means detachably mounted on said tubular housing.

3. A portable tool for use in seismic operations, including:

a. a two-part auger comprising a tubular housing and a bit having earth-engaging blades, said housing defining a bore extending throughout its length;

said bit including a hollow tubular stem which extends above the bit, the stem being slidably and non-rotatably mounted in the bore of said housing, and the stem having two substantially diametrically-opposed, longitudinally-extending keyways;

the wall of the bore of said housing having two diametrically-opposed, longitudinally-extending keys mating with said keyways to allow said bit to axially move relative to said housing from a fully-retracted position to a fully-extended position, and a fluid outlet port in said stem for providing a fluid flow path between said bore and the outside of said tool.

* * * * *